(12) United States Patent
Eyer

(10) Patent No.: US 9,936,231 B2
(45) Date of Patent: Apr. 3, 2018

(54) TRIGGER COMPACTION

(71) Applicant: Sony Corporation, Tokyo (JP)

(72) Inventor: Mark Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 19 days.

(21) Appl. No.: 13/782,694

(22) Filed: Mar. 1, 2013

(65) Prior Publication Data

US 2013/0254824 A1 Sep. 26, 2013

Related U.S. Application Data

(60) Provisional application No. 61/613,880, filed on Mar. 21, 2012.

(51) Int. Cl.
*H04N 21/235* (2011.01)
*H04N 21/236* (2011.01)
(Continued)

(52) U.S. Cl.
CPC ........ *H04N 21/2353* (2013.01); *H04H 20/93* (2013.01); *H04H 60/13* (2013.01);
(Continued)

(58) Field of Classification Search
CPC ............. H04N 21/235; H04N 21/2353; H04N 21/23614; H04N 21/4345; H04N 21/4351;
(Continued)

(56) References Cited

U.S. PATENT DOCUMENTS 7,028,327 B1  4/2006  Dougherty et al.
7,774,815 B1 *  8/2010  Allen ................ H04N 21/4722
                                                            725/51

(Continued)

FOREIGN PATENT DOCUMENTS

EP         1 380 945 A2   1/2004
WO    WO 2005/006758 A1   1/2005
(Continued)

OTHER PUBLICATIONS

International Search Report dated May 17, 2013 in PCT/US2013/030646 filed Mar. 13, 2013.
(Continued)

*Primary Examiner* — Randy Flynn
(74) *Attorney, Agent, or Firm* — Oblon, McClelland, Maier & Neustadt, L.L.P.

(57) ABSTRACT

A method, non-transitory computer-readable storage medium, and reception apparatus for processing one or more triggers associated with audio/video (A/V) content, and an information providing apparatus for providing the one or more triggers. The method includes receiving by the reception apparatus the A/V content and a first trigger associated with the received A/V content. Further, the reception apparatus retrieves a trigger parameters table (TPT), associated with the A/V content, from a TPT server identified in the received first trigger. The TPT defines at least one event associated with the A/V content and defines, for each of the at least one event, a parameter used to perform a process and corresponding to the respective event.

21 Claims, 19 Drawing Sheets

(51) Int. Cl.
| | |
|---|---|
| *H04N 21/434* | (2011.01) |
| *H04N 21/435* | (2011.01) |
| *H04N 21/443* | (2011.01) |
| *H04N 21/462* | (2011.01) |
| *H04N 21/643* | (2011.01) |
| *H04N 21/81* | (2011.01) |
| *H04N 21/84* | (2011.01) |
| *H04N 21/8545* | (2011.01) |
| *H04N 21/858* | (2011.01) |
| *H04H 20/93* | (2008.01) |
| *H04H 60/13* | (2008.01) |

(52) U.S. Cl.
CPC ... *H04N 21/23614* (2013.01); *H04N 21/4345* (2013.01); *H04N 21/4351* (2013.01); *H04N 21/812* (2013.01); *H04N 21/8173* (2013.01); *H04N 21/84* (2013.01); *H04N 21/8545* (2013.01); *H04N 21/8586* (2013.01); *H04N 21/4431* (2013.01); *H04N 21/4622* (2013.01); *H04N 21/64322* (2013.01)

(58) Field of Classification Search
CPC .......... H04N 21/4431; H04N 21/4622; H04N 21/812; H04N 21/8173; H04N 21/84; H04N 21/8545; H04N 21/8586; H04N 21/64322
USPC ............... 725/32, 40, 105, 110, 112, 116
See application file for complete search history.

(56) References Cited

U.S. PATENT DOCUMENTS

| | | | |
|---|---|---|---|
| 7,889,964 B1 | 2/2011 | Barton et al. | |
| 2002/0162120 A1 | 10/2002 | Mitchell | |
| 2004/0010771 A1 | 1/2004 | Wallace et al. | |
| 2004/0010792 A1* | 1/2004 | Wallace et al. | 719/318 |
| 2004/0210942 A1* | 10/2004 | Lemmons | 725/135 |
| 2005/0005303 A1 | 1/2005 | Barone, Jr. et al. | |
| 2005/0262539 A1 | 11/2005 | Barton et al. | |
| 2007/0022437 A1 | 1/2007 | Gerken | |
| 2007/0124796 A1 | 5/2007 | Wittkotter | |
| 2007/0300273 A1* | 12/2007 | Turner | 725/105 |
| 2008/0216137 A1* | 9/2008 | Van Der Heijden | 725/110 |
| 2009/0034556 A1 | 2/2009 | Song et al. | |
| 2009/0276819 A1* | 11/2009 | Kim et al. | 725/105 |
| 2009/0320064 A1 | 12/2009 | Soldan et al. | |
| 2010/0134701 A1 | 6/2010 | Eyer | |
| 2010/0146376 A1 | 6/2010 | Reams | |
| 2010/0162307 A1 | 6/2010 | Suh et al. | |
| 2010/0215340 A1 | 8/2010 | Pettit et al. | |
| 2011/0075990 A1 | 3/2011 | Eyer | |
| 2011/0088075 A1 | 4/2011 | Eyer | |
| 2011/0128443 A1 | 6/2011 | Blanchard et al. | |
| 2011/0221863 A1 | 9/2011 | Eyer | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0174171 A1* | 7/2012 | Bouchard | H04N 21/25858 725/100 |
| 2012/0185888 A1 | 7/2012 | Eyer et al. | |
| 2012/0189010 A1* | 7/2012 | Lee et al. | 370/392 |
| 2012/0236113 A1 | 9/2012 | Eyer | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Eyer | |
| 2013/0036440 A1 | 2/2013 | Eyer | |
| 2014/0201796 A1* | 7/2014 | Moon et al. | 725/110 |

FOREIGN PATENT DOCUMENTS

| | | |
|---|---|---|
| WO | WO 2011/066171 A2 | 6/2011 |
| WO | WO 2011/074218 | 6/2011 |
| WO | WO 2013/012676 A1 | 1/2013 |

OTHER PUBLICATIONS

International Search Report and Written Opinion dated May 31, 2013 in PCT/US13/33133 filed Mar. 20, 2013.
International Search Report and Written Opinion dated Jun. 17, 2013 in PCT/US2013/036075 filed Apr. 11, 2013.
U.S. Appl. No. 13/562,946, filed Jul. 31, 2012, Eyer.
U.S. Appl. No. 13/559,188, filed Jul. 26, 2012, Kitazato.
U.S. Appl. No. 13/587,975, filed Aug. 17, 2012, Kitazato.
U.S. Appl. No. 13/593,554, filed Aug. 24, 2012, Kitazato et al.
U.S. Appl. No. 13/648,753, filed Oct. 10, 2012, Yamagishi.
U.S. Appl. No. 13/679,624, filed Nov. 16, 2012, Yamagishi.
U.S. Appl. No. 13/708,313, filed Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
Office Action dated Apr. 21, 2015, in Chinese Patent Application No. 201280026304.4 (with English translation).
Extended Search Report dated Nov. 3, 2015 in European Patent Application No. 13777548.2.
Extended Search Report dated Oct. 12, 2015 in European Patent Application No. 13765058.6.
Extended European Search Report dated Jul. 27, 2015 in Patent Application No. 13764907.5.
Extended European Search Report dated Jun. 30, 2015 in Patent Application No. 12814180.1.
Extended European Search Report dated Jun. 22, 2015 in Patent Application No. 12814551.3.
Office Action dated Aug. 10, 2016 in Russian Patent Application No. 2013151678(with English translation).

* cited by examiner

Establish Media Timing

| | |
|---|---|
| Format | <domain_name>"/"<program_id>"?mt="<media_time> |
| Example | xbc.us/223?mt=200909 |
| Purpose | Signal location of TPT; establish media timing |
| Usage Examples | • Response from ACR server<br>• broadcast periodically throughout program to allow receivers to synchronize and pre-load interactive content<br>• Live and non-live content |

FIG. 9A

Live Event Trigger

| | |
|---|---|
| Format | <domain_name>"/"<program_id>"?id="<trigger_id> |
| Example | xbc.us/223?id=9 |
| Purpose | Cause the TPT event identified in trigger_id to be immediately executed |
| Usage Examples | Live events |

FIG. 9B

Signal Upcoming Event Timing

| | |
|---|---|
| Format | <domain_name>"/"<program_id>" ?id="<trigger_id> "?et="<event_time> |
| Example | xbc.us/223?id=8?et=310909 |
| Purpose | • Schedule execution of TPT event identified in trigger_id — e.g. when media_time equals event_time;<br>• Allows precise, synchronized timing<br>• Decouples timing uncertainty of delivery of trigger from execution time |
| Usage Examples | • Live events<br>• Can be broadcast periodically throughout program to update timing of events in TPT |

FIG. 9C

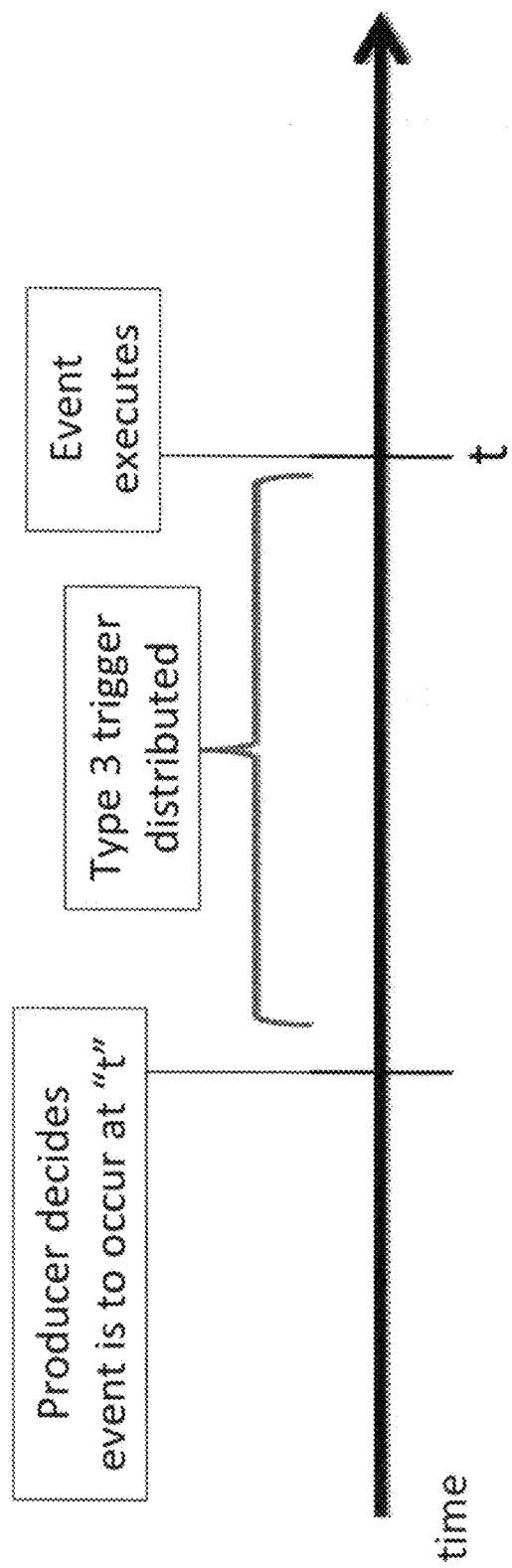

| Element /Attribute (with @) | Number to be permitted | Description & Value |
|---|---|---|
| command | | |
| @id | 1..N | Equal to Trigger_id |
| @destination | 0..1 | Device type "receiver": receiver itself "external_1" external device type1 "external_2" external device type2 |
| @action | 1 | Action "execute" "register" "suspend" "terminate" "event" |
| application | 1 | Description for target TDO |
| @id | 1 | TDO ID |
| @type | 1 | TDO type |
| @url | 0..1 | TDO URL |
| @priority | 0..1 | Priority to Persist 1:High 0: Normal |
| @expire_date | 0..1 | Expire date |
| event | 0..1 | Description for event |
| @id | 1 | Event ID |
| data | 0..1 | Embedded data |

FIG. 11A

```
<tpt>
<command id=1 destination="receiver" action="register">
    <application id="1" type="html" url="xxx.com/yyy1" expire_date="2011-01-21 "/>
</command>
<command id=2 destination="receiver" action="execute">
    <application id="1" type="html" url="xxx.com/yyy1" expire_date="2011-01-21 "/>
</command>
<command id=3 destination="receiver" action="event">
    <application id="1"/>
    <event id="event1">
        <data>zzzzzz・・・・z</data>
    </event>
</command>
<command id=4 destination="receiver" action="suspend">
    <application id="1" />
</command>
<command id=5 destination="receiver" action="terminate">
    <application id="1" />
</command>
<command id=12 destination="receiver" action="execute">
    <application id="2" type="html" url="xxx.com/yyy2" expire_date="2011-01-22 "/>
</command><command id=15 destination="receiver" action="terminate">
    <application id="2"/>
</command>
</tpt>
```

FIG. 11B

ItvTrigger is a variable-length command delivered in the C3 code set as defined in CEA-708.

Name: ItvTrigger — Interactive TV Trigger

Format: Variable-length

Command Coding:

| $b_7$ | $b_6$ | $b_5$ | $b_4$ | $b_3$ | $b_2$ | $b_1$ | $b_0$ | |
|---|---|---|---|---|---|---|---|---|
| 0 | 0 | 0 | 1 | 0 | 0 | 0 | 0 | EXT1 |
| 1 | 0 | 0 | 1 | 1 | 0 | 0 | 0 | 0x98 |
| 1 | 1 | 0 | $L_4$ | $L_3$ | $L_2$ | $L_1$ | $L_0$ | |
| | | | trigger() | | | | | (variable length) |

Description: the ItvTrigger command provides for the transport of interactive TV trigger data. The ItvTrigger command is transported in standard caption Service #6.

Parameters:

* *Length (L)* is an unsigned integer that shall indicate the number of bytes following the header, in the range 11 to 27.

FIG. 13A

|  | No. of bits | Format | No. of Bytes |
|---|---|---|---|
| trigger() { | | | |
| reserved | 4 | bslbf | 1 |
| trigger_type | 4 | uimsbf | |
| for (i=0; k<L-1; k++) { | | | |
| trigger_character | 8 | uimsbf | 1 |
| } | | | |
| } | | | |

Table 1 Caption Disparity Data Syntax trigger_type — a 4-bit unsigned integer that shall indicate the type of trigger to follow. Currently, only type 0 triggers are defined. The value of trigger_type shall be set to 0. Receivers are expected to disregard instances of the ItvTrigger command indicating triggers of any other (unrecognized) type.

trigger_character — an 8-bit ASCII character whose value is restricted to those allowed for Uniform Resource Identifiers (URIs) by RFC 2396.

The character string formed by trigger() shall be a valid URI per RFC 2396.

FIG. 13B

TRIGGER COMPACTION

CROSS-REFERENCE TO RELATED APPLICATIONS

This application is related and claims priority under 35 U.S.C. § 119(e) to U.S. provisional patent application No. 61/613,880, filed Mar. 21, 2012, which is incorporated by reference in its entirety. This application is related to U.S. provisional patent application No. 61/509,679, filed Jul. 20, 2011, which is incorporated herein by reference in its entirety. The present application is also related to U.S. provisional patent application No. 61/531,360, filed Sep. 6, 2011.

BACKGROUND OF THE INVENTION

Field of the Invention

Embodiments described herein relate generally to a method, non-transitory computer-readable storage medium, reception apparatus, and information providing apparatus for trigger compaction. More particularly, the embodiments described herein relate generally to reducing the size of a trigger.

Background

Modern televisions and set top boxes are capable of performing numerous functions in addition to receiving and presenting television broadcasts. Some functions include the display of an electronic programming guide (EPG), widgets that allow a television viewer to pull up web pages and tools right alongside programs being watched on a television, and the like. Many of these functions require that the television or set top box receive additional data. For example, in the case of the EPG, the television or set top box would need to receive program information.

In some cases the additional data is provided along with the television broadcast. When the additional data is provided in this manner the amount of data that can be provided is often limited. As a result, it may be necessary to reduce the amount of additional data provided along with the television broadcast or obtain the additional data from another source.

SUMMARY OF THE INVENTION

According to an embodiment of the present disclosure, there is provided a method of a reception apparatus for processing one or more triggers associated with audio/video (A/V) content. The method includes receiving by the reception apparatus the A/V content and a first trigger associated with the received A/V content. The reception apparatus retrieves a trigger parameters table (TPT), associated with the A/V content, from a TPT server identified in the received first trigger. The TPT defines at least one event associated with the A/V content and defines, for each of the at least one event, a parameter used to perform a process and corresponding to the respective event.

Further, according to an embodiment of the present disclosure, there is provided a non-transitory computer-readable storage medium storing a program which when executed by a computer causes the computer to perform the method of the reception apparatus, as described above.

Further, according to an embodiment of the present disclosure, there is provided a reception apparatus. The reception apparatus includes a first receiver, a second receiver, and a processor. The first receiver is configured to receive A/V content. The second receiver is configured to receive a first trigger associated with the received A/V content. The processor is configured to retrieve a TPT, associated with the A/V content, from a TPT server identified in the received first trigger. The TPT defines at least one event associated with the A/V content and defines, for each of the at least one event, a parameter used to perform a process and corresponding to the respective event.

Further, according to an embodiment of the present disclosure, there is provided an information providing apparatus. The information providing apparatus includes a controller and a communication unit. The controller is configured to retrieve and/or generate a plurality of triggers. The plurality of triggers include two or more of a first trigger that includes a current media time of A/V content to be received by a reception apparatus; a second trigger that includes an identifier of a TPT event corresponding to a parameter to be used by the reception apparatus to perform a process when the second trigger is received by the reception apparatus; and a third trigger that includes an event time and an identifier of a TPT event that is to be executed when an elapsed media time of the A/V content received by the reception apparatus is equal to the event time. The communication unit is configured to provide the plurality of triggers to the reception apparatus and is one of a satellite broadcast transmitter, a cable television transmitter, a terrestrial television broadcast transmitter, and a network interface card.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9A-9C illustrate exemplary triggers;

FIGS. 10A and 10B illustrate an exemplary usage of a trigger for signaling the timing of an upcoming event;

FIGS. 11A and 11B illustrate an exemplary TPT;

FIG. 13 illustrates an exemplary method for transporting the trigger using the closed captioning transport is illustrated in FIGS. 13A and 13B.

DETAILED DESCRIPTION

Figure 1:
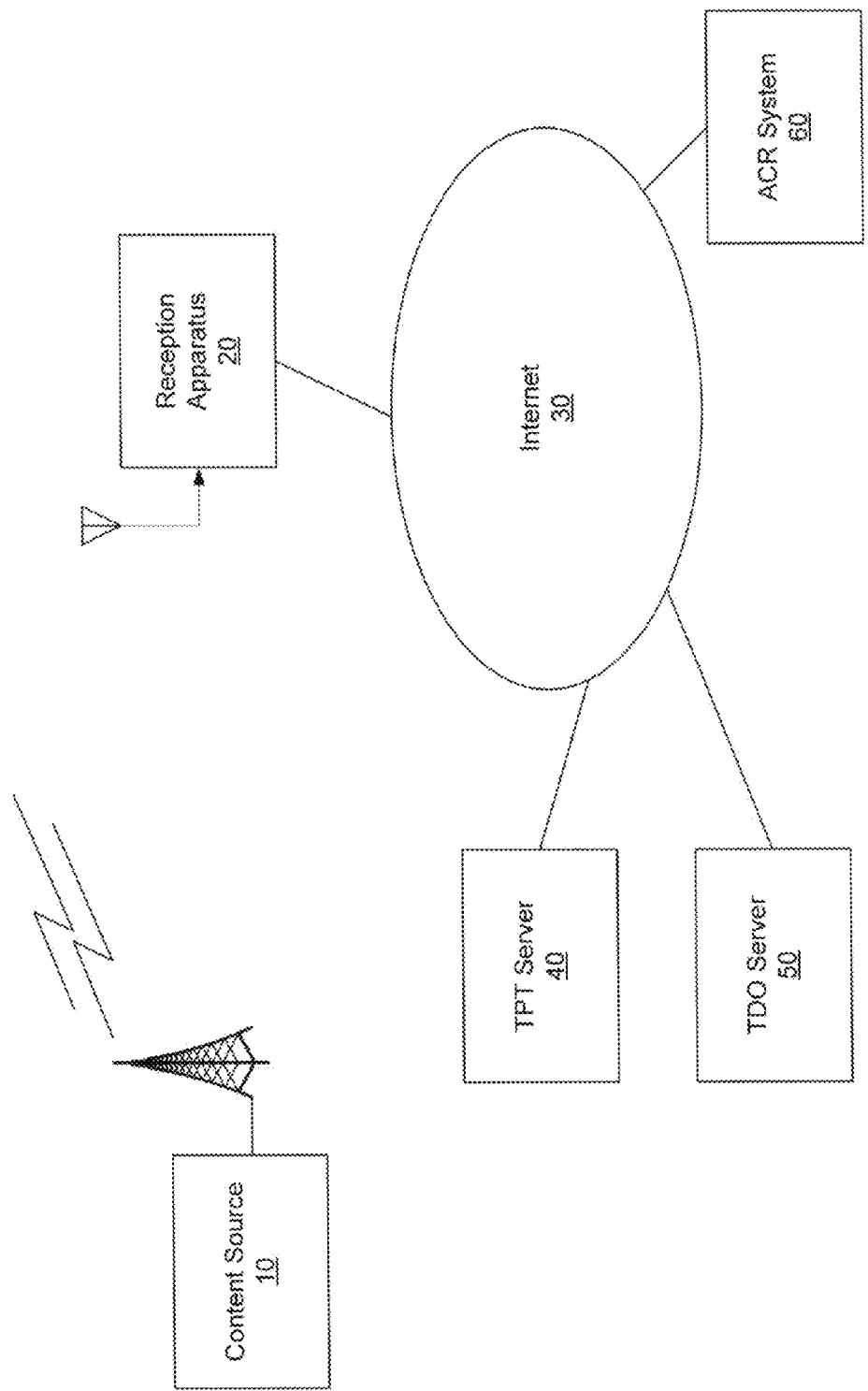
FIG. 1 illustrates an exemplary broadcast system including a content source, reception apparatus, trigger parameters table (TPT) server, triggered declarative object (TDO) server, and an automatic content recognition (ACR) system.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

In interactive television applications, viewers are offered extra content, in addition to the program audio and video, that allows them to interact with the programming in some way. The extra content could be as simple as an Internet universal resource locator (URL) that points to a website that can provide further information about the program, item, or service being shown. Or, the interactive element could provide text and graphics that augment the program video. An example of the latter is an element that displays a particular player's updated statistics during the course of a sporting event.

Often, the behavior or appearance/disappearance of these interactive elements is dependent on the timing of events within the program. Television receivers which are rendering these objects must be able to receive the appropriate signaling to know how and when to make the adjustments to the display of the interactive elements. The objects which perform this signaling function may be called "triggers" because they act to trigger a certain operation at the designated time. The varieties of operations that may be triggered are endless. Simple examples include such things as "execute" (start the operation of the interactive function), "hide" (remove all visible elements from the display), perform some designated action such as display some text or graphic, and "terminate" (end all operations and release memory resources).

The trigger itself must be transported from the point in the distribution chain at which the interactive element is sourced and operated all the way to the consumer's receiver. A variety of transport methods are possible for the trigger object. The trigger can be included in the digital transport multiplex in a variety of different locations, or it can be provided by an Internet-based server and accessed by receivers that are Internet-connected. Possible locations in the digital transport include in video or audio "user data," within the closed captioning transport (e.g., using one of the standard copy services such as service number 6), within a descriptor carried in a program specific information (PSI) table, within adaptation fields of the MPEG-2 Transport Stream packet, and modulated within the video itself in luminance or chrominance.

In each case, smaller triggers are preferable. For example, a trigger that can be represented in as few as 30 bytes (or characters of text) offers greater flexibility in transport and greater efficiency compared to one whose size might be 100 or more bytes. In embodiments of the present disclosure, interactivity or other supplemental content is presented in which the trigger function is accomplished using a small, "short," or "compact" trigger.

Referring now to the drawings, FIG. 1 is a block diagram that shows an exemplary broadcast system 2, including a content source 10, a reception apparatus 20, a trigger parameters table (TPT) server 40, a triggered declarative object (TDO) server 50, and an optional automatic content recognition (ACR) system 60. The reception apparatus 20 accesses the TPT server 40, TDO server 50, and ACR system 60 via one or more communication networks such as the Internet 30. In other embodiments, TPTs stored in the TPT server 40 and/or the TDOs stored in the TDO server 60 are provided to the reception apparatus 20 by the content source 10 or the ACR system 60.

The broadcast system 2 provides an interactive digital television feature whereby a viewer is presented with supplemental content that is associated with, and synchronized in time to events within, content provided by the content source 10. The supplemental content includes one or a combination of media types such as audio, video, text, or an image, and/or one or more interactive elements. In one embodiment, the behavior and appearance of the supplemental content is associated with, and synchronized in time to the events within, the content.

In one embodiment, the content source 10 provides content to the reception apparatus 20 via a terrestrial broadcast. In other embodiments, the content source 10 provides the content via at least one of a satellite broadcast, a cable television transmission, a terrestrial television broadcast, cellular network, and data communication network such as a local area network (LAN), wide area network (WAN), or the Internet 30. The content provided by the content source 10 includes one or more television programs, without regard to whether the content is a movie, sporting event, segment of a multi-part series, news broadcast, etc. Further, the content provided by the content source 10 may also include advertisements, infomercials, and other program-like content which may not be reported as a program in an EPG.

Figure 3:
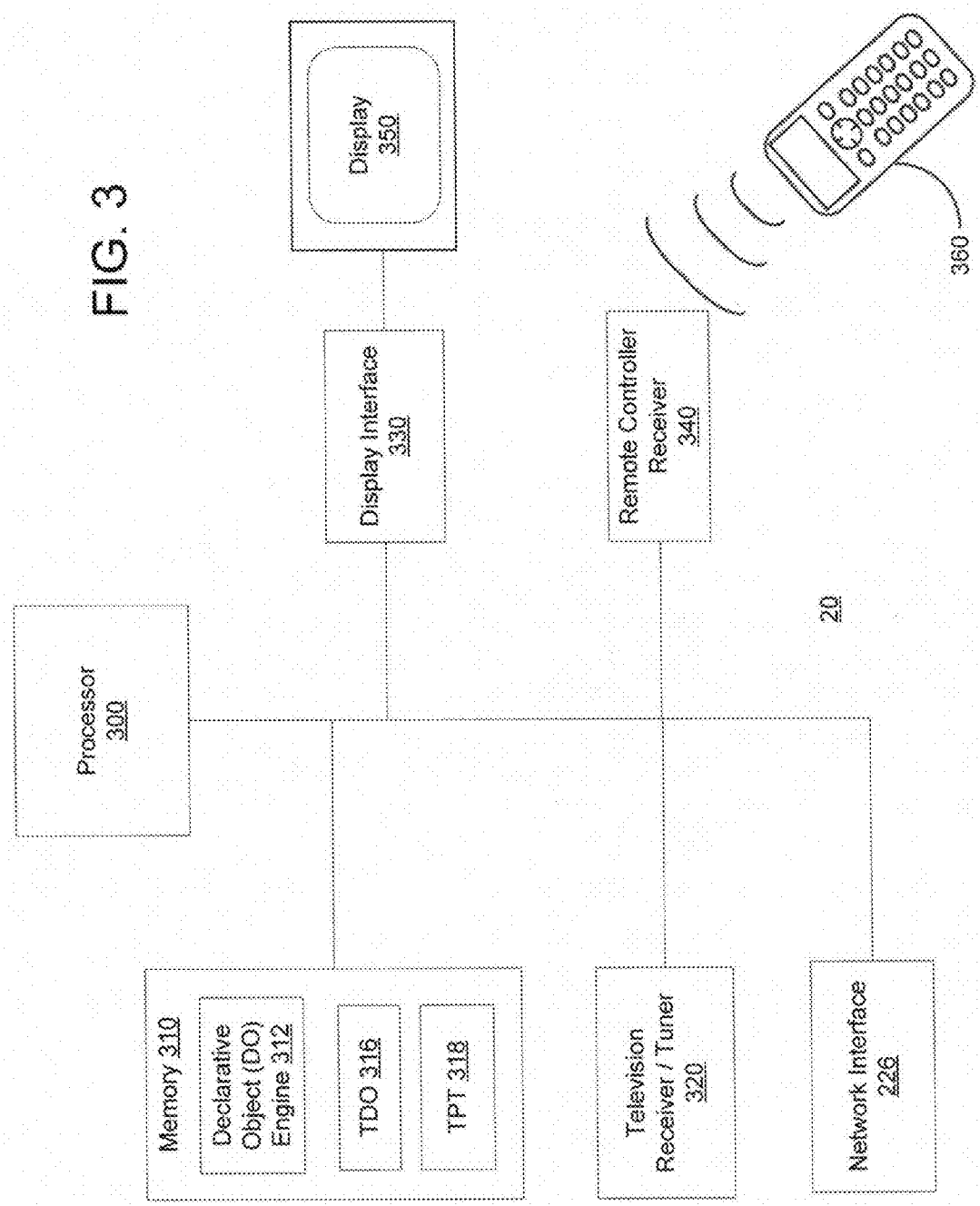
FIG. 3 is a processor-centric block diagram of an exemplary reception apparatus.

The reception apparatus 20 receives the content provided by the content source 10 and displays the content on a display 350, illustrated in FIG. 3. In one embodiment, the display 350 is an integral part of the reception apparatus 20 such as a television set. Alternatively, the display 350 may be external to the reception apparatus 20 such as a television set connected to a set top box.

According to one embodiment, the reception apparatus 20 includes a Declarative Object (DO) Engine that accepts declarative objects (DOs) and renders them along with the content (e.g., audio/video content of a program) received from the content source 10. The DO Engine renders a DO in response to a specific request from a user or in response to a trigger event. A DO that is rendered in response to a trigger event is referred to as a triggered declarative object (TDO).

The TDO is a downloadable software object created by a content provider, content creator, or service provider, which includes declarative content (e.g., text, graphics, descriptive markup, scripts, and/or audio) whose function is tied in some way to the content it accompanies. An embodiment of the TDO is described in U.S. application Ser. No. 12/959,529 filed Dec. 3, 2010 entitled "Announcement of Triggered Declarative Objects" to Blanchard et al. which is hereby incorporated by reference in its entirety. However, the TDO is not limited to the structure described in Blanchard et al. since many attributes defined therein as being a part of a TDO could be situated in a trigger or vice versa or not present at all depending upon the function and triggering of a particular TDO.

The TDO is generally considered as "declarative" content to distinguish it from "executable" content such as a Java applet or an application that runs on an operating system platform. Although the TDO is usually considered to be a declarative object, a TDO player (e.g., the DO Engine) supports a scripting language that is an object-oriented programming language. The TDOs, in examples shown herein, are received from a content or service provider, via for example TDO Server 50, in advance of the time they are executed so that the TDO is available when needed. Moreover, an explicit trigger signal may not be necessary and a TDO may be self-triggering or triggered by some action other than receipt of a trigger signal. Various standards bodies may define associated behaviors, appearances, trigger actions, and transport methods for content and metadata for a TDO. Additionally, requirements regarding timing accuracy of TDO behaviors relative to audio/video may be defined by standards bodies.

The trigger is a data object, which is optionally bound to a particular item of content (e.g., a television program) that references a specific TDO instance, by the use of a file name or identifier for an object that has already been or is to be downloaded. Certain TDOs will only make sense in conjunction with certain content. An example is a TDO that collects viewer response data, such as voting on a game show or contest.

In one embodiment, the DO Engine receives triggers tied to coincide with various points (e.g., trigger events) in the content such as a scene change or the beginning or ending of an ad segment. The triggers are divided into two command types: (1) those that are processed by the DO Engine (referred to as triggers associated with type 1, lifecycle, or DO Engine commands), and (2) those that are passed by the DO Engine to the TDO for processing (referred to as triggers associated with type 2 or DO event commands). The triggers associated with a type 1 command are associated with, for example, commands and/or parameters to be executed by the DO Engine. The triggers associated with a type 2 command are associated, for example, with parameters (e.g., commands, data, etc.) to be processed within the DO itself to effect changes in appearance, behavior, or state of associated supplemental content.

A trigger may be transported within a broadcast emission stream as described, for example, in U.S. patent application Ser. No. 13/216,375, which is incorporated herein by reference in its entirety. For example, a trigger may be transported in a Packetized Elementary Stream (PES) in an MPEG-2 Transport Stream (TS). A trigger may also be transported via other paths such as the Internet. In one embodiment, when the trigger is not available via the broadcast emission stream, the reception apparatus 20 acquires the trigger via the ACR system 60 by, for example, sending AN samples of the content being received by the reception apparatus 20 to the ACR system 60. Other content identifying information may also, or alternatively, be provided to the ACR system 60.

In other embodiments, the trigger is embedded in the content itself. For example, the trigger may be embedded in an audio or a video portion of the content and recovered by processing of the decoded audio or the video in the reception apparatus 20. In another example, the trigger is embedded in the closed captioning transport.

When using the closed captioning transport to provide triggers, variable-length commands may be placed into the DTV caption data (CEA-708 stream) without adverse effects on legacy receivers. CEA-708 is incorporated herein by reference in its entirety. Advantages of providing the trigger using the closed captioning transport include the fact that no new interfaces, hardware upgrades, or re-architecture are needed in the distribution chain; the trigger rides in a caption data packet (CDP) (per SMPTE 334M, which is incorporated herein by reference in its entirety); the captioning stream can survive in cases where elementary streams are stripped (re-multiplexing in multi-channel video programming distributor (MVPD) systems); and CEA-708 data can be present in NRT file thus enabling interactivity for file-based content. An exemplary method for transporting the trigger using the closed captioning transport is illustrated in FIGS. 13A and 13B.

For some methods of transporting the trigger, smaller sized objects are preferred. In such a case, the trigger should be able to be represented within a small number of bits or bytes. Further, some transport methods may limit the maximum size of the trigger to a fixed number of bytes.

Embodiments of the present disclosure provide some approaches to a system design in which the trigger itself can be represented within a small number of bytes, in order to facilitate convenient and robust transport. In one embodiment, the trigger is limited to, or less than, 30 bytes.

The representation of the trigger in a small number of bytes addresses issues such as a need for small, short, compact, and robust triggers for transport methods with limited data carrying capacity; and a need to accommodate variable-sized payloads, which are often awkward to transport. Some embodiments of the present disclosure also address the desire to offer a flexible system in which the TDO can be "table-driven" (e.g., its actions and behavior are specified by data in an associated table, rather than being coded into the TDO itself). This allows a single TDO script to be usable in a variety of situations.

The use of small-sized triggers is desirable over interfaces such as a High-Definition Multimedia Interface (HDMI) in which, for example, the trigger may need to be encoded in other signals communicated over those interfaces.

To reduce the size of the trigger, a subset or all of the parameters associated with the trigger are provided to the reception apparatus 20 separately, instead of being included in the trigger itself. In one embodiment, the one or more parameters associated with the trigger are provided to the reception apparatus 20 in a TPT provided by the TPT server 40. In another embodiment, the TPT may be provided with EPG data. The TPTs stored in the TPT server 40 may be pushed to, or pulled (e.g., polling) by, the reception apparatus 20. In some embodiments, the TPT can be provided by other sources via the Internet such as the ACR system 60 or other methods of transport such as the broadcast emission. The TPT may be represented in XML, as illustrated in FIGS. 11A and 11B, although any other representations may be used.

The TPT includes a primary key (e.g., a tag element, trigger event id, etc.) that associates each element (row) in the table with an associated trigger event. Each trigger, in turn, will refer to a particular event in the TPT by means of this key.

In one embodiment, the reception apparatus 20 is configured to receive updated versions of a TPT when available. The capability to receive an updated version of the TPT provides increased flexibility in providing trigger events when it is difficult to determine the exact timing of trigger events ahead of time, such as in the case of live programming. During the live programming, the TPT can be updated to include timing information once it has been determined. For example, updated versions of the TPT may include modified or new timing information associated with a trigger for displaying supplemental content during the live programming. In another example, the TPT can be updated to refer to different content based on the outcome of the live event. An example of a method for updating the TPT is via the exemplary trigger illustrated in FIG. 9C. However, it is noted that the TPT need not actually be updated with the information included in the trigger to execute a command associated with the associated scheduled event.

In another embodiment, the TPT remains unchanged as the program progresses. The timing of execution of specific interactive events is determined by the appearance of a trigger referencing a specific event. When the receiving apparatus 20 receives a trigger, the event referenced in the TPT is executed. An example of the trigger referencing the specific event is the exemplary trigger illustrated in FIG. 9B.

Figure 6A:
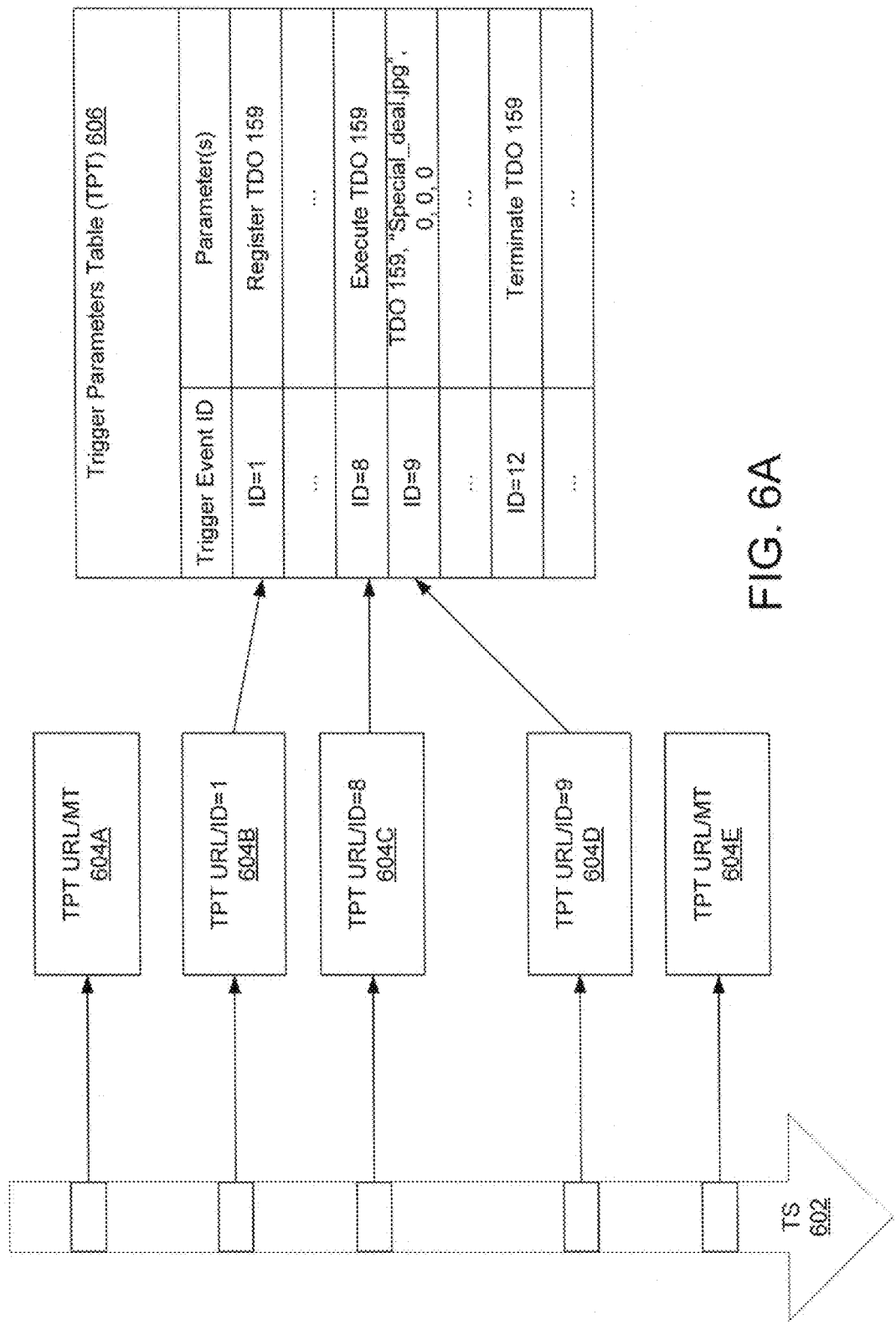
FIG. 6A-6D illustrate exemplary triggers and associated TPTs.
Figure 6B:
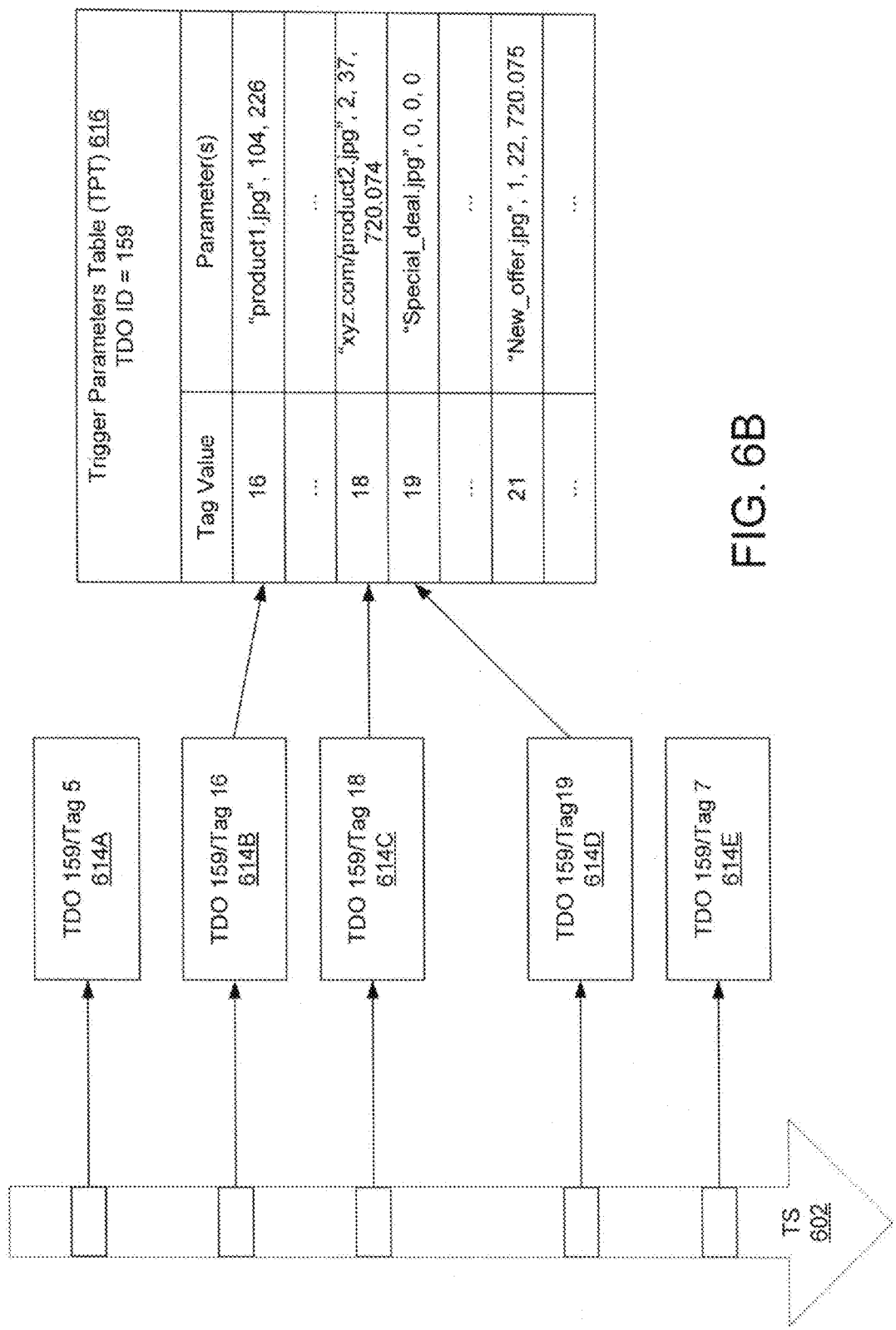
Figure 6C:
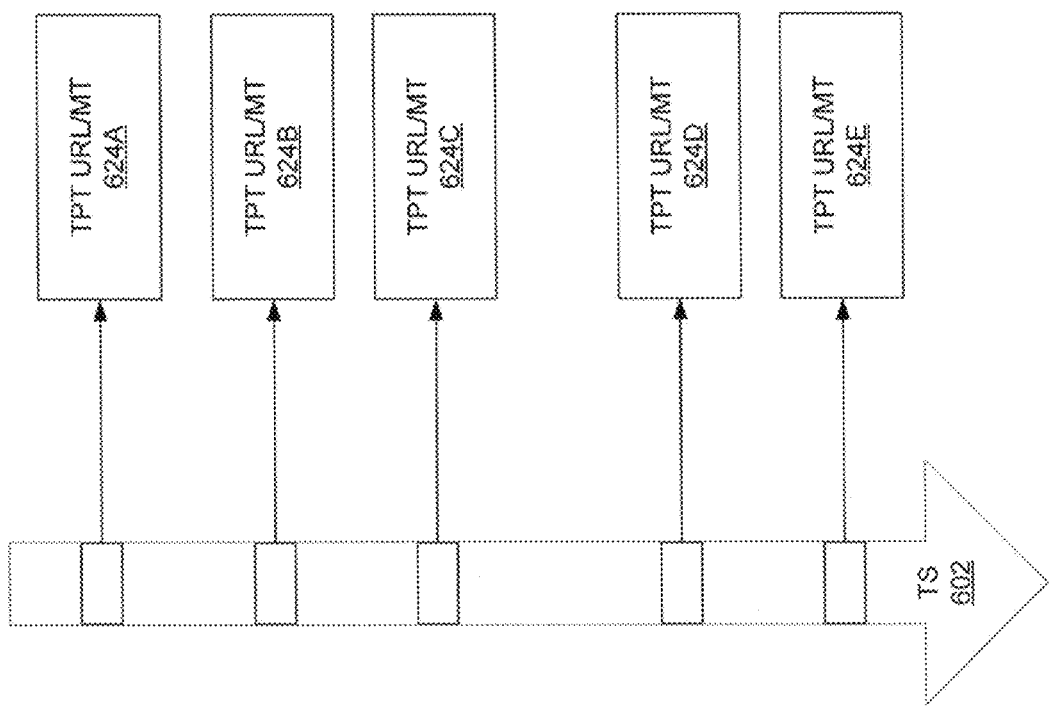

While a trigger indicates that the time is right for the TDO to perform a certain action, a series of timed actions can be played out without a trigger as illustrated for example in FIG. 6C. The TPT optionally provides timing information for various interactive events relative to "media time." Each item of interactive content has a timeline for its playout; an instant of time on this timeline is called media time. For example, a 30-minute program may have an interactive event at media time ten minutes and 41 seconds from the beginning of the program, or media time 10:41. The TPT can include an entry indicating the details of the event that is to occur at time 10:41. Once the reception apparatus 20 determines the current timing relative to the start of the program, it can use the TPT to play out all subsequent events.

In one embodiment, the reception apparatus 20 determines the media time based on the exemplary trigger illustrated in FIG. 9A. For example, the reception apparatus 20 determines the media time internally and uses the media time defined in the trigger for synchronization purposes or as a reference point to determine the elapsed time at any point of the received content (e.g., a television program). It should be noted that the media time is not limited to the inclusion of minutes and seconds and can use any other increments of time or reference points such as frames to designate the timing of the events.

The reception apparatus 20 may determine the availability of an updated TPT by referring to a non-real-time (NRT) file in a File Delivery over Unidirectional Transport (FLUTE), such as a file version number indicated in a Transport Object Identifier (TOI). FLUTE is defined in RFC 3926, which is incorporated herein by reference in its entirety. In another embodiment, the reception apparatus 20 receives the updated TPT by posting a GET request to the TPT server 40 which remains pending until a new TPT is available. In another embodiment, the reception apparatus 20 periodically accesses a source of the TPT to determine whether a new TPT is available.

Likewise, triggers may be available via an Internet-based server. As with TPT updates, the reception apparatus 20 may post a GET request to the TPT server 40 which remains pending until a new trigger is available.

Figure 2:
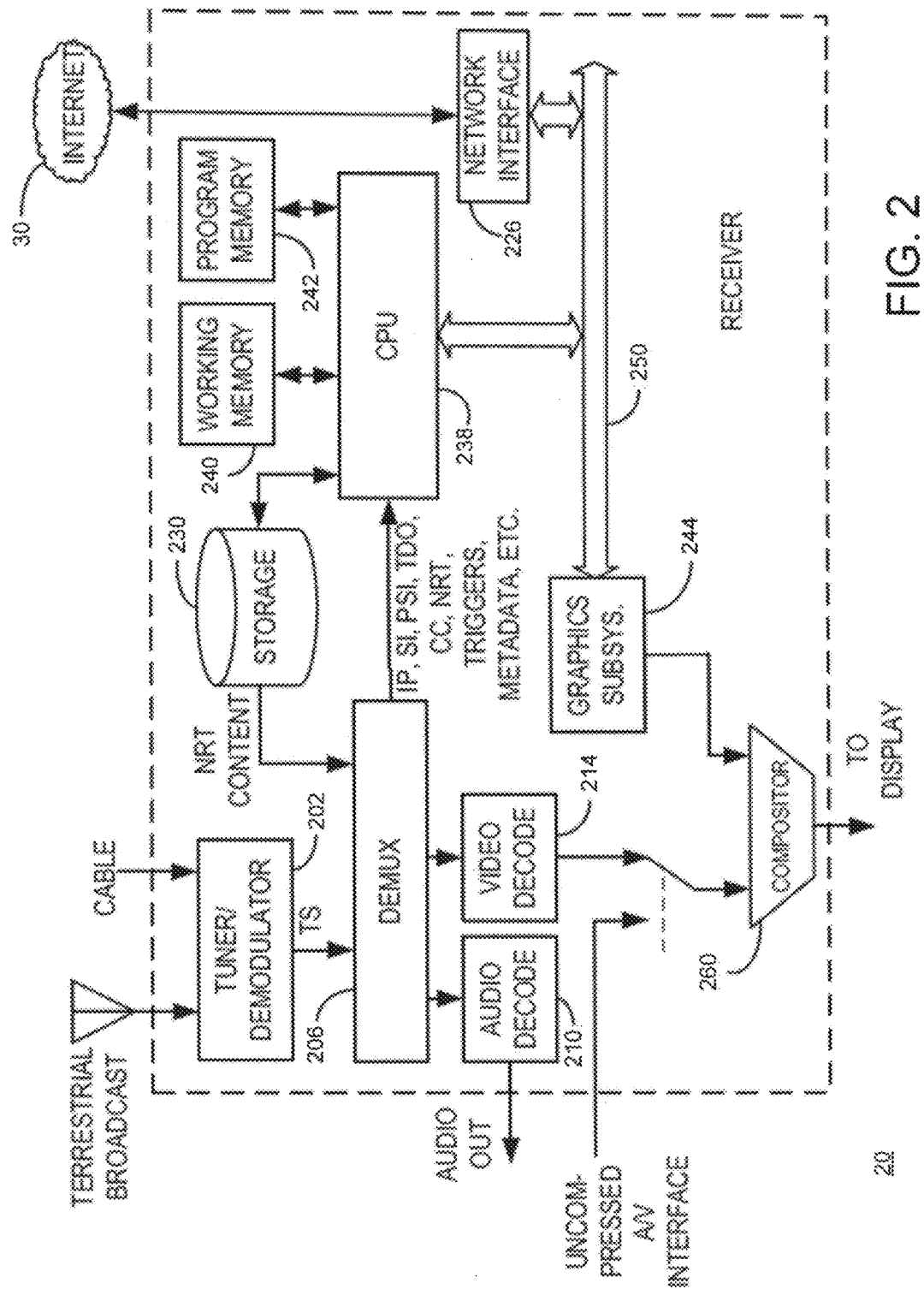
FIG. 2 is a block diagram of an exemplary reception apparatus.

FIG. 2 illustrates an embodiment of the reception apparatus 20. The reception apparatus 20 is a digital television receiver device that may be incorporated into a television set or a set top box. The reception apparatus 20 includes a tuner/demodulator 202, which receives content from one or more content sources such as a terrestrial broadcast or a cable television transmission. The reception apparatus 20 may also, or alternatively, receive content from a satellite broadcast. The tuner/demodulator 202 receives a transport stream (TS), which is demultiplexed by the demultiplexer 206 into audio and video (A/V) streams. The audio is decoded by an audio decoder 210 and the video is decoded by a video decoder 214. Further, uncompressed A/V data may be received via an uncompressed A/V interface (e.g., a HDMI interface) that can be selectively utilized.

In one embodiment, the TS includes ancillary information such as one or more of caption data, TDOs, triggers, TPTs, etc. However, in other embodiments, the A/V content and/or the ancillary information may be received via the Internet 30 and a network interface 226.

A storage unit 230 is provided to store NRT or Internet-delivered content such as Internet Protocol Television (IPTV). The stored content can be played by demultiplexing the content stored in the storage unit 230 by the demultiplexer 206 in a manner similar to that of other sources of content. The storage unit 230 may also store one or more TDOs, triggers, and TPTs acquired by the reception apparatus 20.

The reception apparatus 20 generally operates under control of at least one processor, such as CPU 238, which is coupled to a working memory 240, program memory 242, and a graphics subsystem 244 via one or more buses (e.g., bus 250). The CPU 238 receives closed caption data from the demultiplexer 206 as well as any other information such as TDO announcements and EPGs used for rendering graphics, and passes the information to the graphics subsystem 244. The graphics outputted by the graphics subsystem 244 are combined with video images by the compositor and video interface 260 to produce an output suitable for display on a video display.

Further, the CPU 238 operates to carry out functions of the reception apparatus 20 including the processing of related triggers, TDOs, TPTs, and browser operations. The browser operations include accessing a service specified by a URL given by the TDO or trigger. The CPU 238 further operates to execute script objects (control objects) contained in the TDO, its trigger(s), etc., using for example the DO Engine Although not illustrated in FIG. 2, the CPU 238 may be coupled to any one or a combination of the reception apparatus 20 resources to centralize control of one or more functions. In one embodiment, the CPU 238 also operates to oversee control of the reception apparatus 20 including the tuner/demodulator 202 and other television resources.

A more processor-centric view of the reception apparatus 20 is illustrated in FIG. 3. Memory and storage 230, 240, and 242 are depicted collectively as memory 310. Further, a processor 300 includes one or more processing units such as CPU 238. Similarly, the various demodulators, decoders, etc., that initially process digital television signals are collectively depicted as television receiver/tuner 320. The reception apparatus 20 further includes a remote controller 360 which communicates with a remote controller receiver interface 340. Additionally, the display 350 is connected to a display interface 330, which includes for example the uncompressed A/V interface and/or compositor 260, and is either a display integral to the reception apparatus 20 as in a television set or a connected display device as in the case where the reception apparatus 20 is integrated into a set-top box.

Memory 310 contains various functional program modules and data. The memory 310 stores the data used by the reception apparatus 20. The memory 310 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM). When a TDO 316 is received, the TDO 316 is stored in the memory 310. The TDO execution is carried out by a DO Engine 312. The TDO, when executed by the DO Engine 312 presents supplemental content based on one or more triggers associated with the TDO. The memory 310 also stores a TPT 318, which in one embodiment, defines one or more parameters for each trigger associated with the TDO.

Figure 4:
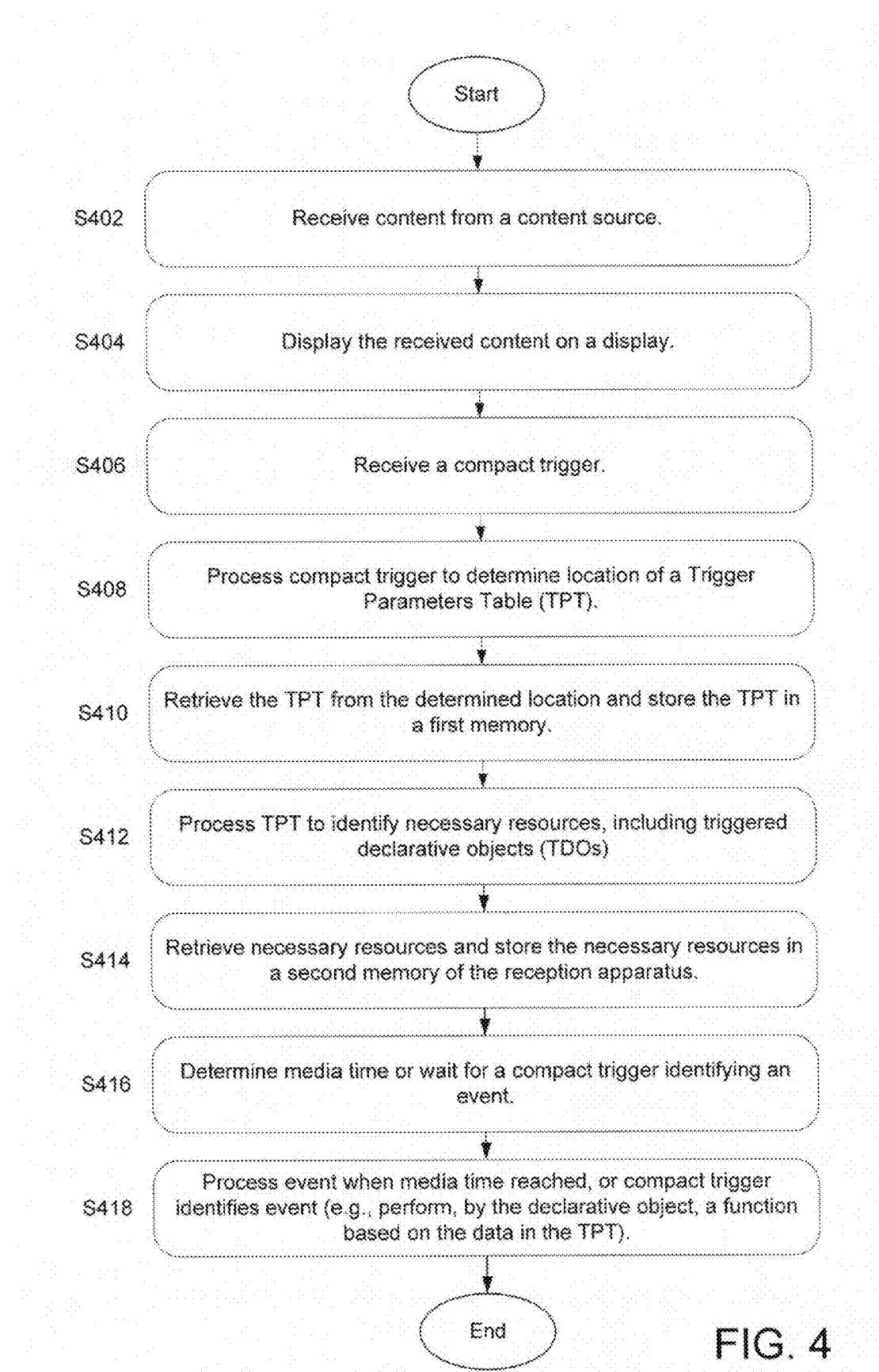
FIG. 4 illustrates a flow diagram of an exemplary method for processing a trigger.

FIG. 4 provides an overview of an exemplary method for processing triggers by, for example, the reception apparatus 20. In step S402, the reception apparatus 20 receives content (e.g., a television program) from a content source, such as the content source 10. The received content is presented to the user of the reception apparatus 20, in step S404. In step S406, the reception apparatus 20 receives a trigger associated with the received content. The reception apparatus 20 processes the trigger, in step S408, to determine a location of a TPT. In step S410, the reception apparatus 20 retrieves the TPT from the determined location and stores the TPT in a first memory of the reception apparatus 20. Further, in step S412, the reception apparatus 20 processes the retrieved and stored TPT to identify necessary resources, including triggered declarative objects (TDOs), associated with the TPT. The determined necessary resources are subsequently retrieved and stored in a second memory of the reception apparatus 20 in step S414. In step S416, the reception apparatus 20 determines a media time or waits for a trigger identifying an event. Exemplary triggers are illustrated in FIGS. 9A-9C.

When a media time is reached or a trigger identifies an event, in step S418, the reception apparatus processes an event such as having a declarative object perform a function based on the data in the TPT. It should be noted that the event processed in step S416 could correspond to either a type 1 command which the reception apparatus 20 (e.g., the DO Engine 312) knows how to execute or a type 2 command which the reception apparatus 20 passes to the TDO for execution.

In one embodiment, the trigger provides one or a combination of the following functions: (1) identifies the location of a TPT Server, (2) indicates media timing (i.e., where in playout we are), (3) identifies an event to execute now or later, and (4) capability of indicating a parameter to smooth server peak load. Further, in one embodiment, the trigger includes one or a combination of the following contents: (1) URL of the TPT Server or any other identifier of the TPT Server, (2) media time, (3) trigger event ID, (4) new time of specified TPT event, and (5) diffusion timing.

In one embodiment, diffusion timing is included in the trigger when a large number of reception apparatuses 20 need to access content at the same time. For example, a first instance of a trigger for an advertisement or program, may direct each reception apparatus 20 to access one or more files from a server at the same time. The diffusion timing allows the requests from the reception apparatuses 20 to be spread out while ensuring that the one or more files are accessible to each of the reception apparatuses 20 in a timely manner.

Further, the diffusion timing information may or may not be included in subsequent triggers for the advertisement or program. The diffusion timing information may not be needed in subsequent triggers since all the reception apparatuses 20 would already have downloaded the one or more files, except for any reception apparatuses 20 that may have just tuned to the advertisement or program.

An exemplary format of the trigger is as follows:
xbc.tv/7a1?mt=200909

In the exemplary format, "xbc.tv" refers to a domain name registered to an entity that will provide one or more TPTs or content associated with the trigger, such as interactive elements. "/7a1" refers to a name/directory space managed by a registered owner of the domain. That is, "/7a1" identifies a location of the relevant content within the designated domain. Thus, "xbc.tv/7a1" identifies a server/directory where the associated content (e.g., the interactive elements, TPT, etc.) will be found. "?mt=200909" is the parameter portion, which is used to identify for example the media time, event (e.g., trigger event ID), timing updates (e.g., new time of specified TPT event), diffusion timing, etc.

In one embodiment, the parameter portion of the trigger does not include any parameters. An exemplary format of such a trigger is as follows: xbc.us/9b2. A trigger without any parameters can be useful in situations such as when the broadcast stream wants to pre-notify one or more receivers that they should collect the tables or any other information in the referenced directory because they likely will be needed in the short-term.

Exemplary triggers are illustrated in FIGS. 9A-9C. FIG. 9A illustrates a first trigger for establishing media timing. In one embodiment, the reception apparatus 20 uses the media timing as a reference to track an elapsed time of currently received content and/or to determine the location of an associated TPT. Exemplary usages of the first triggers include as a response from an ACR server, periodic broadcasts throughout a program to allow receivers to synchronize and pre-load interactive content, and live and pre-authored content.

FIG. 9B illustrates a second trigger for a live event. When the reception apparatus 20 receives the second trigger, the reception apparatus 20 causes the TPT event identified in the trigger_id to be immediately executed.

FIG. 9C illustrates a third trigger for signaling upcoming event timing. When the third trigger is received by the reception apparatus 20, the reception apparatus 20 schedules execution of a TPT event identified in the trigger_id based on the event_time. In one embodiment, the execution of the TPT event is scheduled for when the media time of the received content is equal to the event_time defined in the third trigger. Exemplary usages of the third triggers include live events and periodic broadcasts throughout a program to update timing events in the TPT.

Figure 10A:
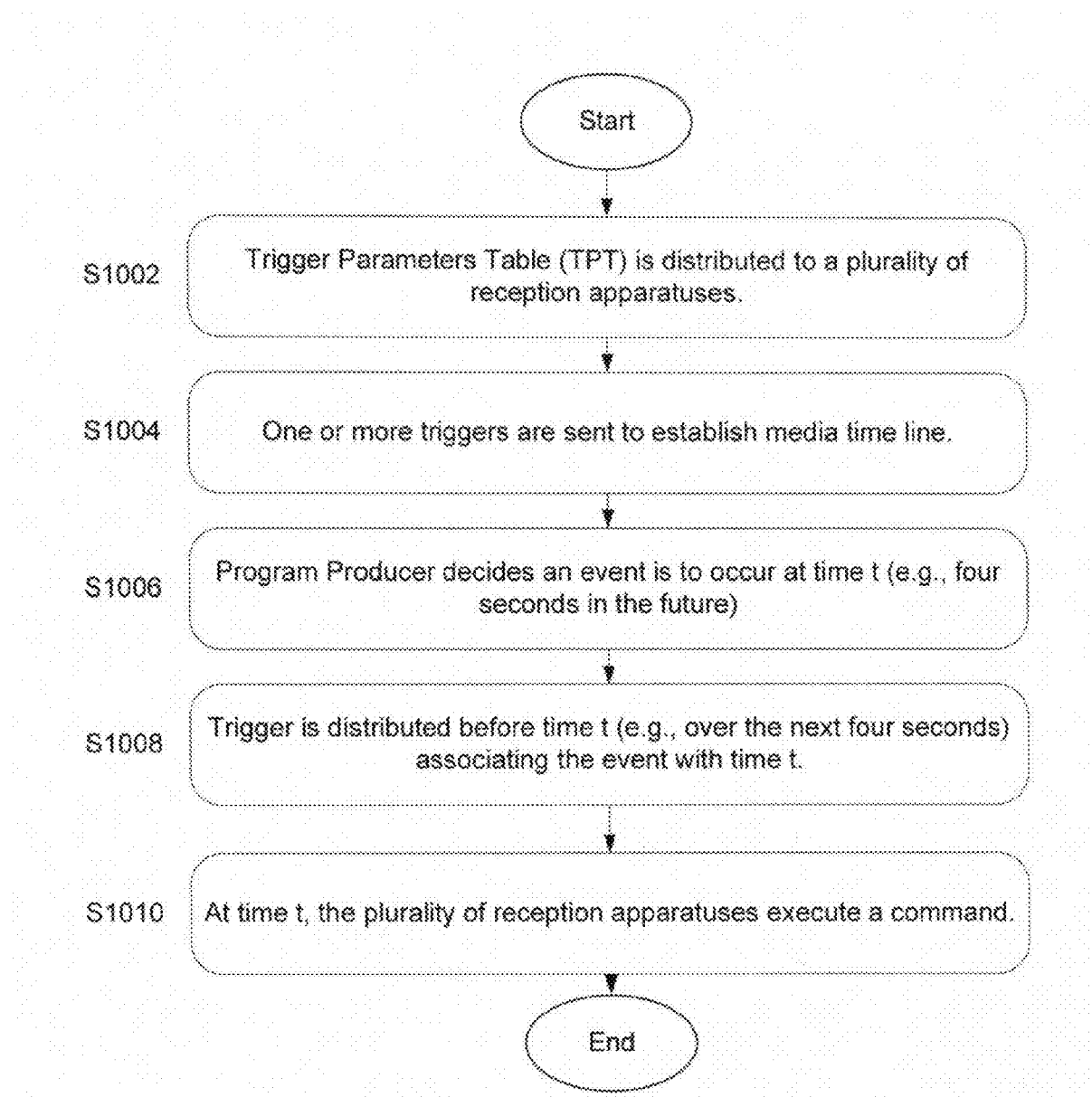

FIGS. 10A and 10B illustrate an example of the usage of the third trigger. As illustrated in FIG. 10A, a TPT is distributed to one or a plurality of reception apparatuses in step S1002. In step S1004, one or more triggers are sent to establish a media time line. In step S1006, a program producer or any other person or entity decides an event is to occur at a certain time t (e.g., four seconds in the future). The trigger associating the event with time t is distributed before the time t in step S1008. For example, the trigger may be distributed to the one or plurality of reception apparatuses over the next four seconds. Further, in step S1010, the one or more plurality of reception apparatuses execute a command associated with the event at time t. FIG. 10B illustrates an exemplary time line of the steps S1006-S1010 described above.

In one embodiment, the TPT includes at least one parameter associated with a trigger event. The TPT and necessary resources such as the TDO may be received from the same or different sources. As noted above, the received TPT is stored in a first memory, and the TDO in a second memory, of the reception apparatus 20 in steps S410 and S414, respectively. The first and second memories may correspond to the same memory such as different portions of the storage 230 or working memory 240, or discrete memories.

In one embodiment, the TDO is downloaded from the TDO server 50 and the TPT is downloaded from the TPT server 40 in response to receiving one or more triggers associated with currently received content.

Once the Internet address (URL) of the TPT server is identified by the trigger, the reception apparatus uses it to acquire the TPT. Upon reception of the TPT, various other referenced assets (e.g., TDOs, files, multimedia assets, etc.), are retrieved by the reception apparatus and stored in memory for possible later use. Once the media time is known, the receiver begins processing the TPT to see if there are any "type 1" commands that are ready for execution.

In step S418, when the reception apparatus 20 receives a trigger associated with a type 1 command (e.g., to execute the TDO), the DO Engine 312, running on the processor 300, executes the TDO. When the reception apparatus 20 receives a trigger associated with a type 2 command in step S418, while the TDO is being executed, the reception apparatus 20 passes the trigger data to the TDO, which retrieves the at least one parameter associated with the trigger event stored in the TPT based on a tag value included in the trigger associated with a type 1 command. Further, the TDO performs a function based on the at least one parameter retrieved.

Figure 5:
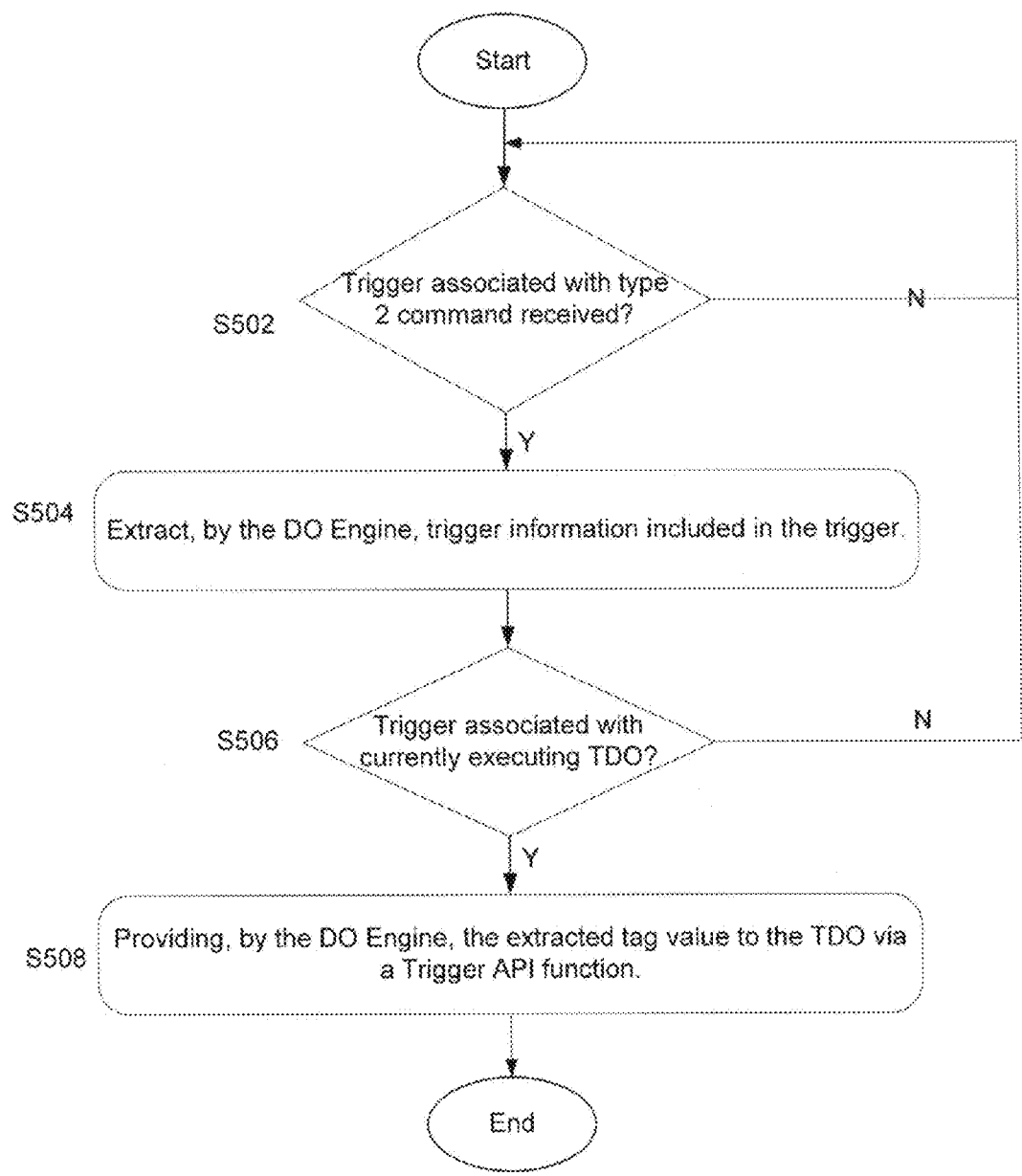
FIG. 5 illustrates a more detailed flow diagram of an exemplary method of a Declarative Object (DO) Engine for processing the trigger.

FIG. 5 is a more detailed illustration of an exemplary method for processing a trigger associated with a type 2 command using the DO Engine. In step S502, the DO Engine determines whether a trigger associated with the type 2 command has been received. In one embodiment, the DO Engine determines the type of the trigger based on whether the trigger specifies a command to be executed by the DO Engine. For example, if the trigger includes a tag value that has been assigned to a command to be executed by the DO Engine.

When the trigger associated with the type 2 command is determined to be received in step S502, the DO Engine extracts trigger information included in the trigger in step S504. In one embodiment, the trigger information includes a TDO identifier and a tag value. The TDO identifier can be any unique identifier such as a reference number, URL, symbol, or other representation. In step S506, the DO Engine determines whether the trigger is associated with a currently executing TDO based on the extracted TDO identifier. When, the trigger is determined to be associated with the currently executing TDO, in step S508, a tag value extracted from the trigger is provided to the TDO, via a trigger application program interface (API) function. The tag value may be extracted with the TDO identifier or at any time prior to the tag value being provided to the TDO.

When the trigger is determined not to be associated with the currently executing TDO, in one embodiment, the trigger is discarded and the DO Engine returns to step S502 and waits for receipt of the next trigger associated with the type 2 command. Alternatively, the DO Engine may temporarily suspend, or terminate, the currently executed TDO and execute the TDO associated with the trigger before proceeding the step S508.

Figure 6D:
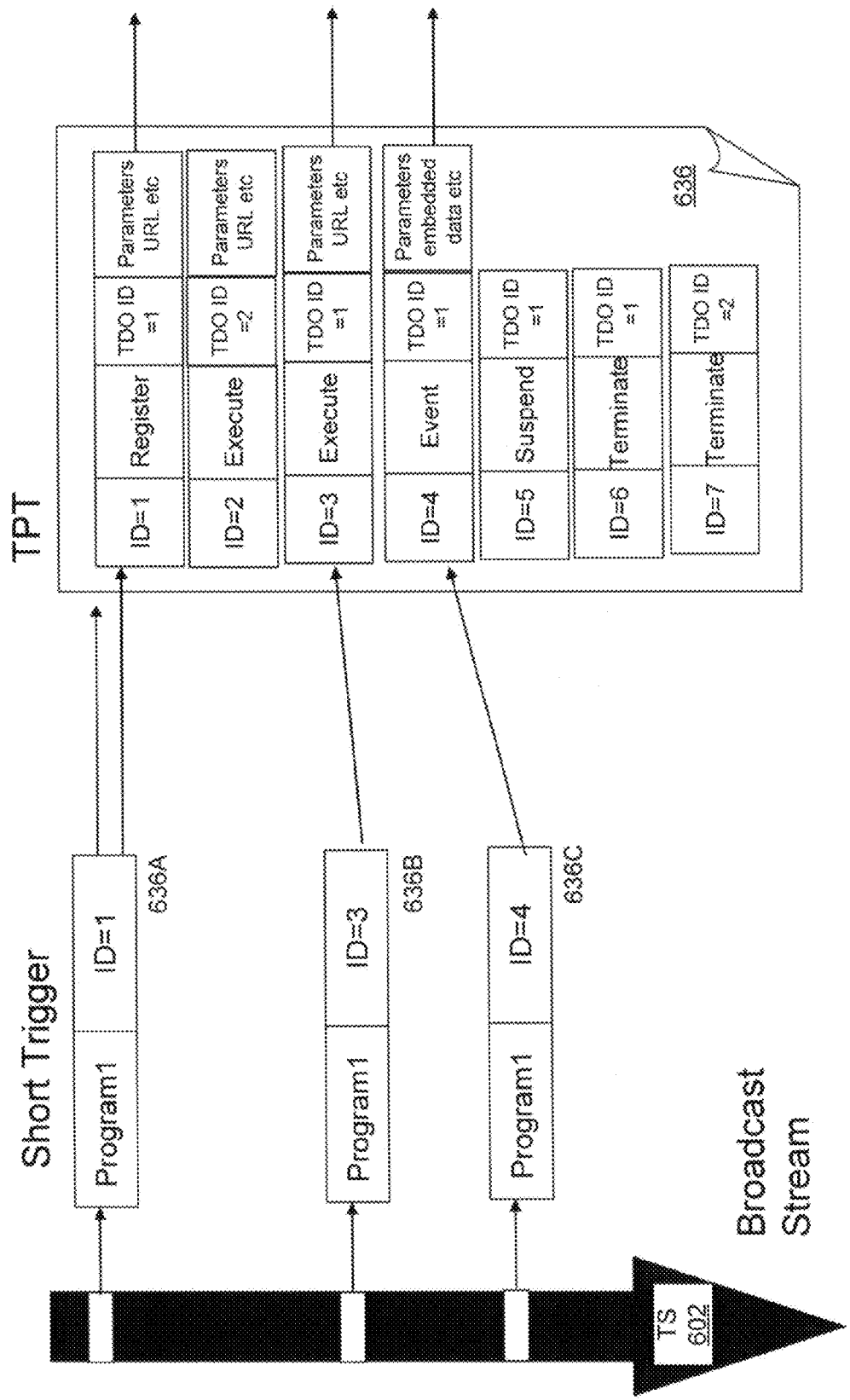
Figure 12:
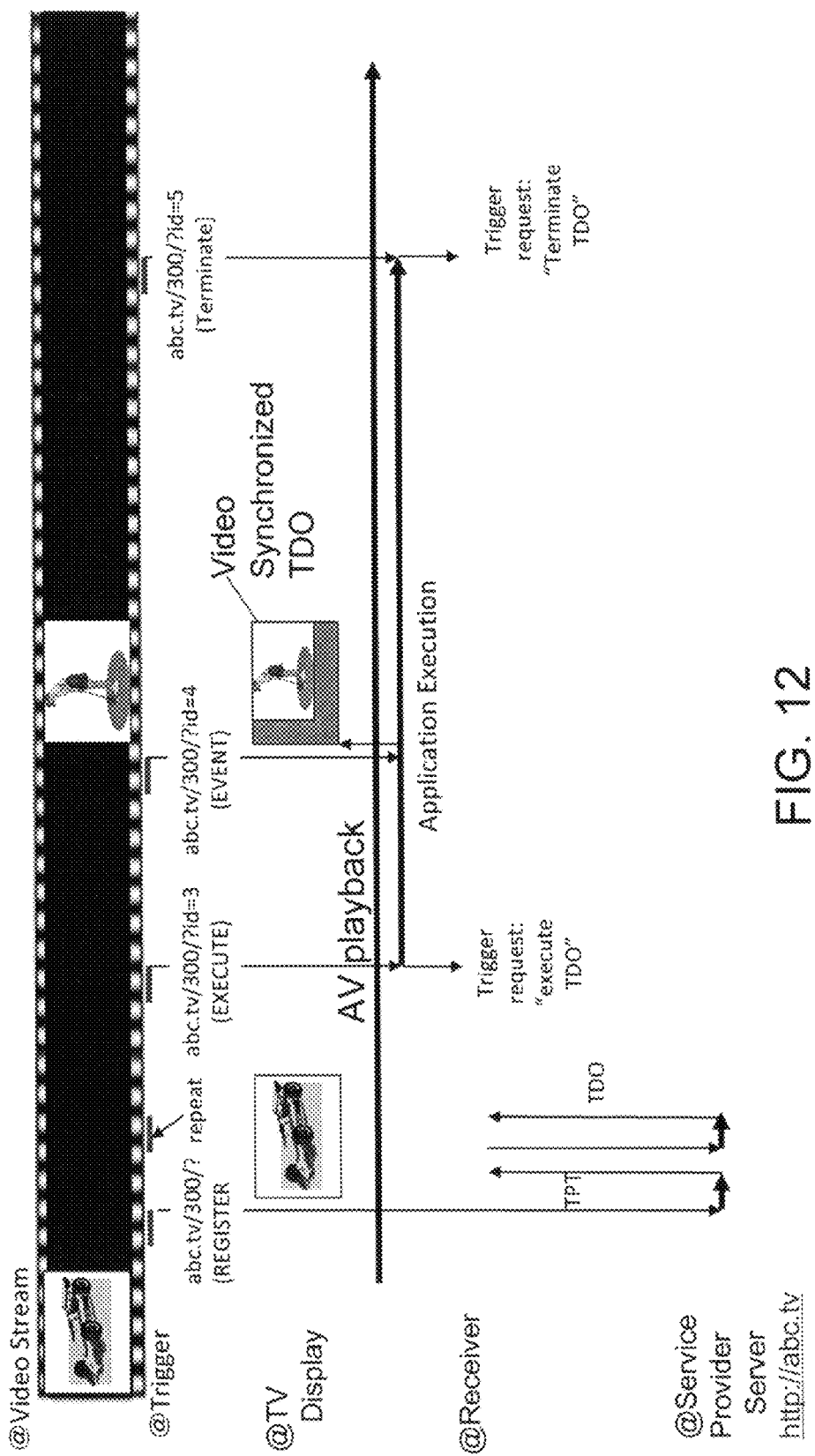
FIG. 12 illustrates exemplary usages of triggers associated with received content.

FIGS. 6A-6D illustrate examples of TPTs 606, 616, 626, 636 and triggers 604A-604E, 614A-614E, 624A-624E, and 636A-636C. FIG. 12 illustrates exemplary usages of triggers associated with received content. As illustrated in each of FIGS. 6A-6D, a TS 602 carrying content has associated with it a plurality of events associated with, for example, user interactivity and/or the display of additional content. Each event has one or more corresponding triggers such as triggers 604A-604E. As illustrated in FIGS. 6A and 6B, in one embodiment, each of the triggers is associated with a TPT. Further, in the example shown in FIG. 6B, each of the triggers is associated with a TDO. As illustrated in FIG. 6D, in one embodiment, each trigger is associated with the TPT using a program identifier.

As noted above, in one embodiment, the triggers are divided into triggers associated with two different types of commands. A trigger associated with a type 1 command is processed by the DO Engine, while a trigger associated with a type 2 command is processed by a TDO. In FIG. 6B, triggers 604A and 604E are examples of triggers associated with type 1 commands, and triggers 604B-604D are examples of triggers associated with type 2 commands.

In one embodiment, each trigger is associated with a row (or element) in the TPT, such as TPT 606, and includes a reference to a specific entry in the TPT using, for example, a tag value. However, the reference to the TPT entry is not limited to a tag value and can be any symbol or representation that can be used to reference an entry in the TPT. Further, certain triggers such as a subset or all of the triggers associated with type 1 commands (e.g., triggers 614A and 614E), or a subset or all of the triggers associated with type 2 commands, need not have corresponding entries in the TPT corresponding to the trigger_ids identified in the respective triggers.

When receiving the trigger associated with a type 1 command, the DO Engine 312 performs a command identified by that trigger. For example, when the reception apparatus 20 receives a trigger 614A with a tag value of 5, the DO Engine executes a TDO 159 that is stored in the reception apparatus 20. In another example, when the reception apparatus 20 receives a trigger 614E with a tag value of 7, the DO Engine terminates, or suspends, the TDO 159. In this embodiment, tag values below 16 are specified in a standard as commands to be executed by the DO Engine. The basic trigger types to be executed by the DO Engine itself include "Register," "Execute," "Suspend," "Resume," and "Terminate." Depending on the embodiment, the execution and/or suspension of the TDO 159 can be performed with or without referring to one or more entries in the TPT.

Any other tag values, symbols, or representations may be reserved for DO Engine commands. Further, in other embodiments, the triggers associated with a type 1 command may refer to the TPT (e.g., as illustrated in FIG. 6A or 6D) or another TPT to provide any parameters required to execute a command. For example, when the trigger is associated with a type 1 command that is "load TDO," the trigger includes the location (e.g., a URL), or a reference to the location (e.g., entry in a TPT), of the TDO so that it can be acquired by the reception apparatus 20. That is, a trigger associated with a type 1 command may include a reference to an entry in a TPT that identifies the location of a TDO and/or other necessary data to be retrieved and executed.

The DO Engine extracts a tag value for the trigger associated with a type 2 command and provides the extracted tag value to a currently executed TDO. The TDO uses the tag value to determine at least one parameter that is associated with the trigger. Then, as noted above, the TDO performs a function based on the retrieved at least one parameter. In another embodiment, the DO Engine provides the at least one parameter to the currently executed TDO.

The TPTs 606, 616, 626 illustrated in FIGS. 6A-6C contain references to image files. As illustrated in FIG. 6B, one graphic is associated with each tag value. However, the TPTs are not so limited and can refer to one or a combination of different media types such as audio, video, or an image, and/or one or more interactive elements. Further, as noted above, predetermined tag values (e.g., below 16) may be specified in a standard as commands to be executed by the DO Engine. Therefore, in one embodiment, the TPT only contains entries for tag values 16 and above.

For example, when the reception apparatus 20 receives a trigger 614B with a tag value of 16, the DO Engine passes the tag value 16 to the currently executing TDO. The DO Engine passes the tag value by calling a Trigger API function and delivers the tag value to the TDO. The Trigger API function may be included in the DO Engine or a separate programming component of the reception apparatus 20. The TDO consults the TPT 616 and determines the parameters associated with the trigger are "product1.jpg" and the numbers 104 and 226. In one embodiment, the function performed by the TDO based on the determined parameters includes rendering the image file "product1.jpg" at location X, Y (104, 226) on the display 350.

The TPT, however, is not limited to including information on image files and position, and can include other parameters such as a media time that designates the timing of the trigger, validity information for defining an expiration date of the trigger, capability codes that allow the reception apparatus 20 to determine whether it is capable of providing the supplemental content associated with the TPT or a specific TPT entry, etc. For example, the TPT may include one or more capability codes that indicate the TPT can only be processed by a reception apparatus supporting ATSC 2.7+, a minimum requirement code such as support for certain media formats and decoders, essential and non-essential capabilities, etc.

Note that, in one embodiment, the DO Engine itself does not try to interpret anything carried in a TPT instance, such as TPT 616. The information contained in the TPT instance is known and interpretable only to the TDO it is designed to work with. Therefore, the number and types of parameters included in a TPT may be customizable based on the requirements of an associated TDO. In other words, the TPT is not limited to including a predetermined set of parameters and may contain any parameter that is required by a particular TDO.

Figure 7B:
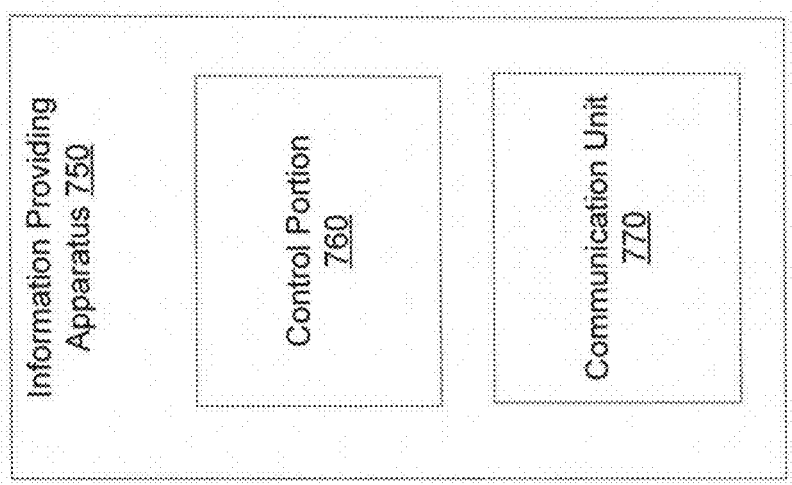
FIGS. 7A and 7B are block diagrams of exemplary information providing apparatuses.
Figure 7A:
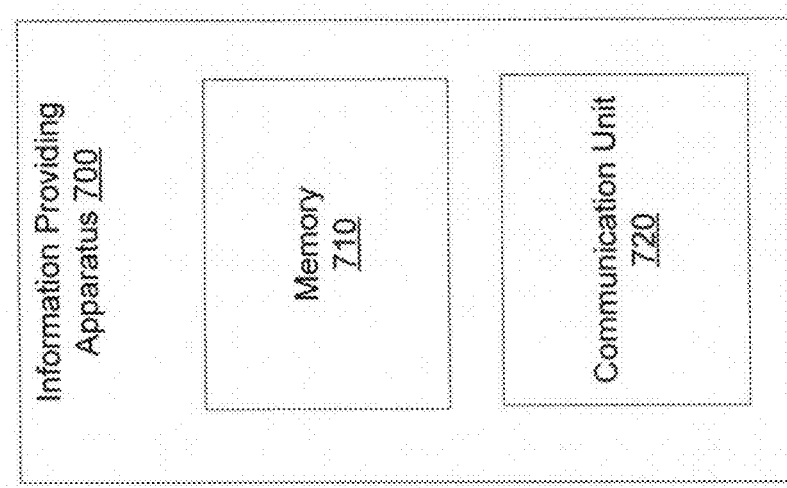

FIG. 7A illustrates an information providing apparatus 700, which may be included in the content source 10, TPT server 40, TDO server 50, ACR system 60, or a stand-alone device. As illustrated in FIG. 7A, the information providing apparatus 700 includes a memory 710 and a communication unit 720. The memory 710 can be implemented using disc storage form as well as other forms of storage such as non-transitory storage devices including for example network memory devices, magnetic storage elements, magneto-optical storage elements, flash memory, core memory and/or other non-volatile storage technologies. Further, the communication unit 720 can be implemented using any one or a combination of a terrestrial broadcast transmitter, a cable broadcast transmitter, a satellite uplink transmitter, a network interface (e.g., WLAN card, Ethernet card, etc.), or the like.

The memory 710 is configured to store a TPT, which is associated with a TDO and includes at least one parameter associated with a trigger event. The communication unit 720 provides the TPT stored in the memory 710 to the reception apparatus 20. For example, the communication unit 720 provides the TPT to the reception apparatus 20 via the TS or the Internet.

FIG. 7B illustrates an information providing apparatus 750, which may be included in the content source 10, TPT server 40, TDO server 50, ACR system 60, or a stand-alone device. As illustrated in FIG. 7B, the information providing apparatus 750 includes a control portion 760 and a communication unit 770. The communication unit 760 can be implemented using any one or a combination of a terrestrial broadcast transmitter, a cable broadcast transmitter, a satellite uplink transmitter, a network interface (e.g., WLAN card, Ethernet card, etc.), or the like.

The control portion 760 is configured to retrieve and/or generate a plurality of triggers, such as a first trigger that includes a current media time of A/V content to be received by a reception apparatus; a second trigger that includes an identifier of a TPT event corresponding to a parameter to be used by the reception apparatus to perform a process when the second trigger is received by the reception apparatus; and a third trigger that includes an event time and an identifier of a TPT event that is to be executed when an elapsed media time of the A/V content received by the reception apparatus is equal to the event time. The communication unit 760 provides the plurality of triggers retrieved and/or generated by the control portion 760 to the reception apparatus 20. For example, the communication unit 760 provides the plurality of triggers to the reception apparatus 20 via the TS or the Internet.

Figure 8:
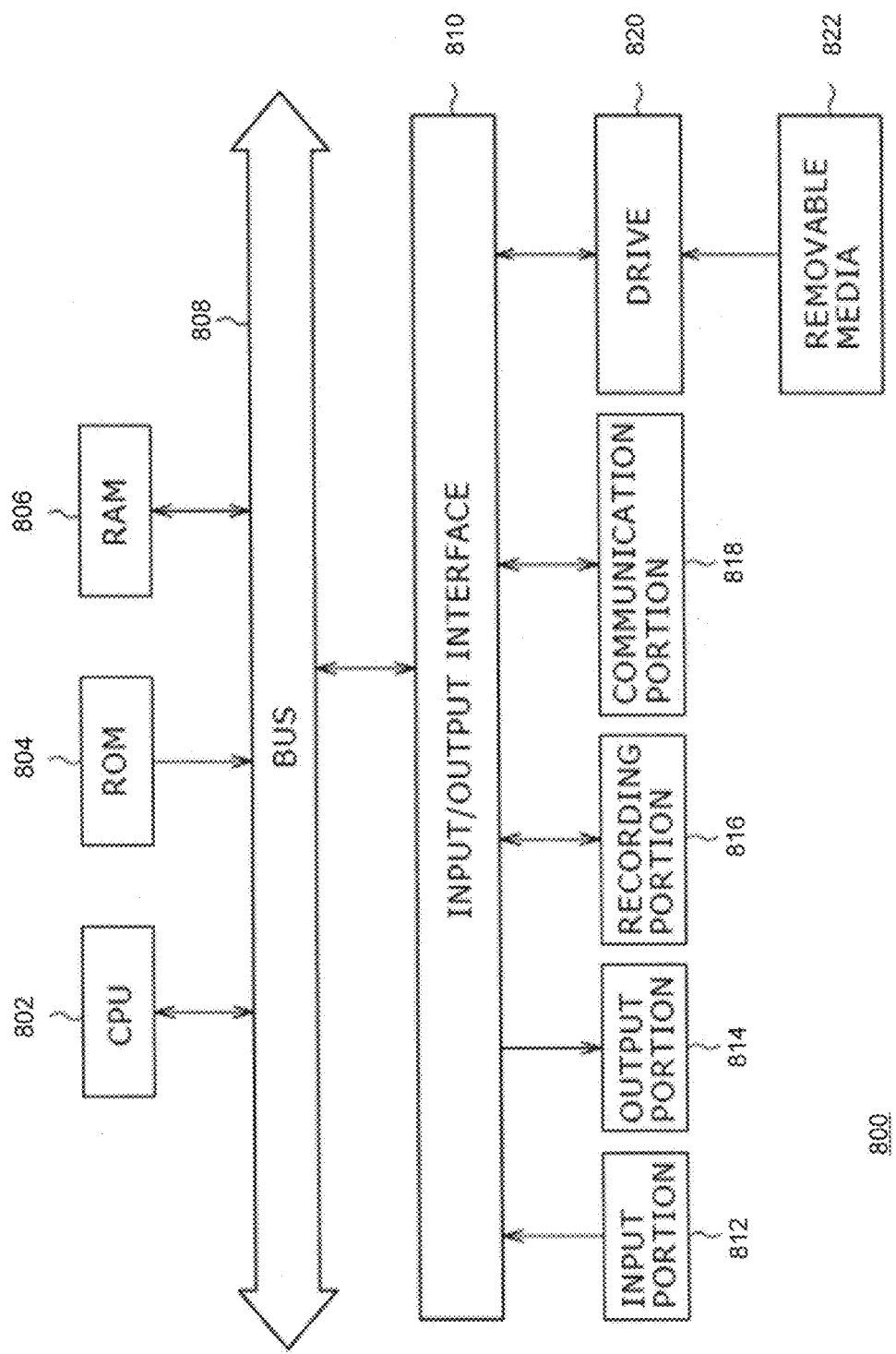
FIG. 8 is an exemplary computer.

FIG. 8 is a block diagram showing an example of a hardware configuration of a computer 800 configured to function as any one or a combination of the content source 10, reception apparatus 20, TPT server 40, TDO server 50, ACR system 60, and information providing apparatus 700.

As illustrated in FIG. 8, the computer 800 includes a central processing unit (CPU) 802, read only memory (ROM) 804, and a random access memory (RAM) 806 interconnected to each other via one or more buses 808. The one or more buses 808 is further connected with an input-output interface 810. The input-output interface 810 is connected with an input portion 812 formed by a keyboard, a mouse, a microphone, remote controller, etc. The input-output interface 810 is also connected to a output portion 814 formed by an audio interface, video interface, display, speaker, etc.; a recording portion 816 formed by a hard disk, a non-volatile memory, etc.; a communication portion 818 formed by a network interface, modem, USB interface, fire wire interface, etc.; and a drive 820 for driving removable media 822 such as a magnetic disk, an optical disk, a magneto-optical disk, a semiconductor memory, etc.

According to one embodiment, the CPU 802 loads a program stored in the recording portion 816 into the RAM 806 via the input-output interface 810 and the bus 808, and then executes a program configured to provide the functionality of the one or combination of the content source 10, reception apparatus 20, TPT server 40, TDO server 50, ACR system 60, and information providing apparatus 700

The various processes discussed above need not be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present invention are possible in light of the above teachings. It is therefore to be understood that within the scope of the appended claims, the invention may be practiced otherwise than as specifically described herein.

The invention claimed is:

1. A method of a reception apparatus for processing one or more event information associated with audio/video (A/V) content, the method comprising:
   receiving by circuitry of the reception apparatus the A/V content;
   receiving first event information associated with the received A/V content;
   retrieving by the circuitry of the reception apparatus an event data set from a server identified based on the received first event information, the event data set defining a plurality of events associated with a downloadable application that is executed in synchronization with the A/V content and defining, for each of the events, an event identifier and event data corresponding to the respective event; and
   performing by the circuitry of the reception apparatus a look up in the event data set, based on the first event information, to identify the event data of one of the events defined in the event data set;
   determining whether the event data of the one of the events defined in the event data set is of a first type that is processed by an application engine of the reception apparatus or a second type that is processed by the downloadable application; and
   passing the event data of the one of the events defined in the event data set to the downloadable application for processing when the event data of the one of the event defined in the event data set is determined to be of the second type, wherein
   the event data for a first one of the events is of the first type and includes a command that causes execution of the downloadable application, and
   the event data for a second one of the events is of the second type and includes a parameter to be processed by the downloadable application.

2. The method according to claim 1, wherein the first event information includes a current media time of the received A/V content, and the method further comprises:
   determining an elapsed media time of the received A/V content based on the current media time included in the first event information.

3. The method according to claim 2, wherein the first event information includes a location of the event data set and the event identifier of the one of the events.

4. The method according to claim 1, further comprising:
   receiving second event information associated with the received A/V content and identifying another one of the events defined in the event data set;
   performing a look up in the event data set based on the second event information to identify the event data of the another one of the events defined in the event data set; and
   performing a process related to the downloadable application using the event data corresponding to the another one of the events identified in the second event information when the reception apparatus receives the second event information.

5. The method according to claim 4, wherein
the second event information includes a location of the server, a location of the event data set in the server, and the event identifier of the another one of the events defined in the event data set.

6. The method according to claim 1, further comprising:
   receiving second event information associated with the received A/V content and identifying a further event defined in the event data set and an event time, the event time identifying a future time of the identified further event defined in the event data set; and
   scheduling performance of a process related to the downloadable application using the event data corresponding to the further event identified in the second event information to occur when an elapsed media time of the A/V content equals the event time defined in the second event information.

7. The method according to claim 6, wherein
the second event information includes a location of the server, a location of the event data set in the server, an event identifier of the further event defined in the event data set, and the event time.

8. The method according to claim 1, further comprising:
   receiving second event information including one or a combination of a location of the server, a location of the event data set in the server, a current media time, the event identifier of another one of the events defined in the event data set, an event time identifying a future time of a specified event defined in the event data set, and diffusion timing information.

9. The method according to claim 1, wherein
each of the event information received by the reception apparatus includes a universal resource locator (URL) of the server and one or a combination of a current media time, the event identifier identifying one of the events defined in the event data set, an event time identifying a future time of a specified event defined in the event data set, and diffusion timing information.

10. A non-transitory computer-readable storage medium storing a program which when executed by a computer causes the computer to perform a method of a reception apparatus for processing one or more event information associated with audio/video (A/V) content, the method comprising:
    receiving by the reception apparatus the A/V content;
    receiving first event information associated with the received A/V content;
    retrieving by the reception apparatus an event data set from a server identified based on the received first event information, the event data set defining a plurality of events associated with a downloadable application that is executed in synchronization with the A/V content and defining, for each of the events, an event identifier and event data corresponding to the respective event;
    performing a look up in the event data set, based on the first event information, to identify the event data of one of the events defined in the event data set;
    determining whether the event data of the one of the events defined in the event data set is of a first type that is processed by an application engine of the reception apparatus or a second type that is processed by the downloadable application; and passing the event data of the one of the events defined in the event data set to the downloadable application for processing when the event data of the one of the event defined in the event data set is determined to be of the second type, wherein the event data for a first one of the events is of the first type and includes a command that causes execution of the downloadable application, and the event data for a second one of the events is of the second type and includes a parameter to be processed by the downloadable application.

11. A reception apparatus, comprising:
circuitry configured to
receive audio/video (A/V) content;
receive first event information associated with the received A/V content;
retrieve an event data set from a server identified in the received first event information, the event data set defining a plurality of events associated with a downloadable application that is executed in synchronization with the A/V content and defining, for each of the events, an event identifier and event data corresponding to the respective event;
perform a look up in the event data set, based on the first event information, to identify the event data of one of the events defined in the event data set;
determine whether the event data of the one of the events defined in the event data set is of a first type that is processed by an application engine of the reception apparatus or a second type that is processed by the downloadable application; and
pass the event data of the one of the events defined in the event data set to the downloadable application for processing when the event data of the one of the event defined in the event data set is determined to be of the second type, wherein
the event data for a first one of the events is of the first type and includes a command that causes execution of the downloadable application, and
the event data for a second one of the events is of the second type and includes a parameter to be processed by the downloadable application.

12. The reception apparatus according to claim 11, wherein
the first event information includes a current media time of the received A/V content, and
the circuitry is configured to determine an elapsed media time of the received A/V content based on the current media time included in the first event information.

13. The reception apparatus according to claim 12, wherein the first event information includes a location of the event data set and the event identifier of the one of the events.

14. The reception apparatus according to claim 11, wherein the circuitry is configured to
receive second event information associated with the received A/V content and identifying another one of the events defined in the event data set,
perform a look up in the event data set based on the second event information to identify the event data of the another one of the events defined in the event data set, and
perform a process related to the downloadable application using the event data corresponding to the another one of the events identified in the second event information when the second receiver receives the second event information.

15. The reception apparatus according to claim 14, wherein
the second event information includes a location of the server, a location of the event data set in the server, and the event identifier of the another one of the events defined in the event data set.

16. The reception apparatus according to claim 11, wherein the circuitry is configured to
receive second event information associated with the received A/V content and identifying a further event defined in the event data set and an event time, the event time identifying a future time of the identified further event defined in the event data set, and
schedule performance of the process using the event data corresponding to the further event identified in the second event information to occur when an elapsed media time of the A/V content equals the event time defined in the second event information.

17. The reception apparatus according to claim 16, wherein
the second event information includes a location of the server, a location of the event data set in the server, an event identifier of the further event defined in the event data set, and the event time.

18. The reception apparatus according to claim 11, wherein the circuitry is configured to receive second event information including one or a combination of a location of the server, a location of the event data set in the server, a current media time, the event identifier of another one of the events defined in the event data set, an event time identifying a future time of a specified event defined in the event data set, and diffusion timing information.

19. The reception apparatus according to claim 11, wherein
each of the event information received by the circuitry includes a universal resource locator (URL) of the server and one or a combination of a current media time, the event identifier identifying one of the events defined in the event data set, an event time identifying a future time of a specified event defined in the event data set, and diffusion timing information.

20. An information providing apparatus, comprising:
circuitry configured to
retrieve and/or generate a plurality of event information, the plurality of event information including
first event information that includes a first event identifier that identifies a first event defined by an event data set, the event data set defining, for the first event, the first event identifier and first event data of a first type, the first event data including a command that causes the reception apparatus to execute a downloadable application, and
second event information that includes a second event identifier that identifies a second event defined by the event data set, the event data set defining, for the second event, the second event identifier and second event data of a second type, the second event data including a parameter to be processed by the downloadable application; and
provide the plurality of event information to the reception apparatus via one of a satellite broadcast, a cable television transmission, a terrestrial television broadcast, and a communication network, wherein the first event information causes the reception apparatus to perform a look up in the event data set, based on the first event information, to identify the command of the first event defined in the event data set, the second event information causes the reception apparatus to perform a look up in the event data set, based on the second event information, to identify the parameter of the second event defined in the event data set, and the reception apparatus determines whether each of the first event data and the second event data corresponds to a first type that is processed by an application engine of the reception apparatus or a second type that is processed by the downloadable application, and the reception apparatus passes the second event data to the downloadable application for processing when the second event data is determined to correspond to the second type.

21. A television set comprising the reception apparatus according to claim 11.

* * * * *